(12) United States Patent
Peterson et al.

(10) Patent No.: US 7,653,931 B1
(45) Date of Patent: Jan. 26, 2010

(54) SYSTEM AND METHOD FOR USER LOGIN AND TRACKING

(75) Inventors: Matthew Peterson, Newport Beach, CA (US); Kevin Alexander, Newport Beach, CA (US); Sydni Vuong, Los Angeles, CA (US); Michael Sepulveda, Lake Forest, CA (US)

(73) Assignee: Mind Research Institute, Santa Ana, CA (US)

( * ) Notice: Subject to any disclaimer, the term of this patent is extended or adjusted under 35 U.S.C. 154(b) by 707 days.

(21) Appl. No.: 11/218,293

(22) Filed: Sep. 1, 2005

(51) Int. Cl.
*H04L 9/32* (2006.01)
(52) U.S. Cl. .................... 726/2; 726/3; 726/4
(58) Field of Classification Search .......... 726/1–9; 713/181–184; 380/44
See application file for complete search history.

(56) References Cited

U.S. PATENT DOCUMENTS 6,317,835 B1 * 11/2001 Bilger et al. ................. 713/194
2005/0044425 A1 2/2005 Hypponen

FOREIGN PATENT DOCUMENTS

GB 2381603 5/2003

OTHER PUBLICATIONS

Peterson, Bodner, Shaw et al., Innate Spatial-Temporal Reasoning and the Identification of Genuis; Neurological Research, vol. 26, No. 1, (Jan. 2004).

Bodner, Peterson, Shaw et al., The Music-Math Connection. Early Childhood Connections, pp. 9-16, vol. 8, No. 3, Greensboro, NC. , (Summer 2002).

Hu, Bodner, Jones, Peterson, Shaw, Data Mining of Mathematical Reasoning Data Relevant to Large Innate Spatial-Temporal Reasoning Abilities in Children: Implication for Data Driven Education. Soc. Neurosci. Abst.34[th] Annual Meeting (2005).

Hu, Bodner, Jones, Peterson, Shaw, Dynamics of Innate Spatial-Temporal Learning Process: Data Driven Education Results Identify Universal Barriers to Learning. 6th Annual International Conference on Complex Systems (2004).

* cited by examiner

*Primary Examiner*—Hosuk Song
(74) *Attorney, Agent, or Firm*—Knobbe Martens Olson & Bear LLP

(57) ABSTRACT

The disclosure provides for systems that generate random strings of objects corresponding to elements of a login code. The disclosure also provides for methods for training individuals in remembering the elements of the login code. Those login code elements, in certain embodiments, are taught to its user by way of a puzzle or game-like environment. That game-like environment, in one embodiment, does not require the use of language-based instructions, which make learning the elements of the login code simple and easy for a wide range and variety of persons. In addition, the login code elements are taught to its user, in certain embodiments, by way of a multi-staged training process, wherein each stage includes a plurality of training sessions. Those training sessions may use a process of spatial and visual recognition. That process may help assist a login code user to remember the elements of the code even if the login code is only periodically used.

20 Claims, 15 Drawing Sheets

SYSTEM AND METHOD FOR USER LOGIN AND TRACKING

BACKGROUND OF THE INVENTION

1. Field of the Invention

The present invention relates to a system and method for generating and teaching random strings of objects, each random string forms an easy to recall login code. The login code may be used for identifying a system user and for tracking the user's development.

2. Description of the Related Art

Computer systems often store valuable and confidential information. To protect the integrity of such systems and maintain the confidentiality of the stored information, users often employ a means of authentication to ensure that only authorized users have access to the valuable information. For instance, users may employ a password to secure their information. Typically, a password is selected by a user and is a sequence of letters, digits and other characters, which the user then memorizes. Conventional passwords have several disadvantages. Often, users select passwords that are easy to remember so that they will have less difficulty in recalling and entering the password into the computer. Such passwords, however, can be easily compromised by persons who know the user well or by strangers who use common words and phrases to crack the password. Because of this issue, some passwords are randomly generated with long sequences. Users, unfortunately, find such passwords difficult to remember and thus, cumbersome to use.

Finding a user authentication scheme for young children becomes even more difficult. Young children often have difficulty generating and remembering their own passwords because of the simple fact that they are not familiar with numbers or letters. However, young children are more amenable to training and learning pre-selected sequences of information. The challenge is conveying information in a form and in a manner that a young child can easily absorb and recall. Another challenge is conveying that information without the use of language-based tools. This disclosure provides embodiments of a user authentication scheme that addresses those challenges. While certain embodiments of the disclosure are geared to young children, the scheme or method has applications to a wide range of users of various ages and ethnicities. Moreover, the method and process provided herein allows users to recall the sequences of information even if they do not use it on a regular basis.

SUMMARY OF CERTAIN INVENTIVE ASPECTS

In one embodiment, the disclosure provides a non-language-based system of login code recognition that deals with sets of objects arranged as buttons across a login screen. Through a short, one-time training process, each individual user or student is able to both spatially and visually recognize each element of his or her login code on a consistent basis. The training process may involve a game having a puzzle or problem that the student is required to figure out. Use of the puzzle or problem may substitute the need for using language-based instructions to teach a user or student in the elements of his or her login code. In the process of figuring out that puzzle, the student understands the rules of the game and is able to learn his or her login code. The game mimics a maze-like environment in which each individual user has a different path through the game. That path is the user's login code. Because of the way in which user data is stored and the ease of use of the non-language-based login code system, users can be identified by login code alone, even after long periods of time during which the program is not used regularly, or even at all.

In another embodiment, the disclosure provides a method of learning a pre-selected, personalized login code having a plurality of elements, wherein each element is a unique identifier. The method comprises evaluating a problem, wherein the problem involves advancing an object displayed on a computer screen from one point to another point on the screen, and identifying a solution to the problem. The solution involves selecting an image from a first set of images on the screen. The first set comprises a plurality of images, wherein one of the images from the first set corresponds to one of the plurality of elements from the login code. Identifying the solution causes the object to become animated and move from one point to another point on the screen.

In another embodiment of the aforementioned method, the problem involves a path from which the object traverses. The path may be between the two points on the screen and serve as a means for pointing to an image from a second set of images on the screen. The second set comprises a plurality of images. The solution further involves selecting the image from the first set that corresponds to the image that the path is pointing to in the second set. The image that the path is pointing to in the second set corresponds to one of the plurality of elements which comprise the login code.

In another embodiment, the disclosure provides for a system for logging onto a network. The system comprising a login code, a plurality of login sessions, a login screen, and an interface between a user and the screen. The login code has an arrangement of elements, wherein each element is a unique identifier with no spatial or meaningful relationship to adjacent elements; each individual element is required for providing access to the system. The plurality of login sessions each has a plurality of images. One image from the plurality of images corresponds to an individual element of the login code. The login screen is for displaying the plurality of login sessions. The interface between the user and the screen enables the user to select items displayed on the screen.

In one embodiment of the aforementioned system, the plurality of login sessions follows the arrangement and order of the elements of the login code.

In another embodiment of the aforementioned system, the plurality of login sessions follows a random sequence having no particular arrangement or order. Logging onto the network is dependent on selecting the image from the plurality of images that corresponds to one element of the login code in each of the plurality of login sessions.

In another embodiment of the aforementioned system, an object is provided on the screen. The object becomes animated when the user successfully selects all of the elements from the login code from the plurality of login sessions. The object in one embodiment may be a character.

In another embodiment, the disclosure provides for a method of using a computerized system to teach a student a pre-selected, personalized login code having a plurality of elements, wherein each element is a unique identifier. The method may comprise generating the login code on the computerized system, using a screen on the system to engage the student, and providing a reward to the student. The student may be engaged in at least one round of training, wherein the at least one round has a plurality of sessions; wherein each session involves having the student solve a problem to learn an element of the login code, wherein the problem is conveyed to the student without the use of language. The award is may be provided when the student solves the problem in each of the plurality of sessions.

In another embodiment of the aforementioned method, the problem comprises an object and a path. The reward may be an animated presentation of the object moving along the path, wherein the object is an animated character.

In another embodiment of the aforementioned method, each session comprises presenting the student with at least two sets of images on the screen, a first set of images along an end of the screen with the path acting as a pointer to one image in the first set, a second set of images along a different end of the screen. The image that the path is pointing to may be an element of the pre-selected login code. The problem is solved when the student selects an image from the second set that corresponds to the image that the path is pointing to. The images of the first set and the second set may be the same and may be arranged in the same sequence.

In another embodiment of the aforementioned method, the number of images from the first set is different than the number of images from the second set. The images from the first set are a subset of the images from the second set.

In another embodiment of the aforementioned method, the method further comprises reinforcing the at least one round of training by taking the student through a login process. The login process comprises a set of images along an end of the screen, a path having at least two ends, and an object on one end of the path. One of the images from the set of images corresponds to one of the elements of the login code. The images in the set of images may change after the student selects the image corresponding to one of the elements of the login code.

In another embodiment of the aforementioned method, the method further comprises completing the training after the student selects all of the elements of the login code from the set of images. Completing the training comprises animating the object from one end of the path to the other end of the path.

In one embodiment, the elements of the login code have a particular arrangement or order. The arrangement of the login code elements dictated by the order of the training sessions. In another embodiment, the elements of the login code are randomly arranged in no particular order.

In another embodiment, the disclosure provides for a computerized system to teach a user a pre-selected, personalized login code having a plurality of elements, wherein each element is a unique identifier. The system, in one embodiment includes means for generating the login code and means for using a screen on the system to engage the user in at least one round of training, wherein the at least one round has a plurality of sessions, wherein each session involves having the user solve a problem to learn an element of the login code, and wherein the problem is conveyed to the user without the use of language. In addition, in one embodiment, the system provides for a means for providing a reward to the user when the user solves the problem in each of the plurality of sessions.

In another embodiment, the disclosure provides for a computer readable storage medium having stored thereon instructions that when executed by a computer processor perform a method of teaching a user a pre-selected, personalized login code. The login code may include a plurality of elements, wherein each element is a unique identifier. The method, in one embodiment, includes generating the login code on the computerized system and using a screen on the system to engage the user in at least one round of training, wherein the at least one round has a plurality of sessions, wherein each session involves having the user solve a problem to learn an element of the login code, and wherein the problem is conveyed to the user without the use of language. In addition, the method, in one embodiment, includes providing a reward to the user when the user solves the problem in each of the plurality of sessions.

BRIEF DESCRIPTION OF THE DRAWINGS

The above and other aspects, features, and advantages of the disclosure will be better understood by referring to the following detailed description, which should be read in conjunction with the accompanying drawings. These drawings and the associated description are provided to illustrate certain embodiments of the invention, and not to limit the scope of the invention.

FIG. 10 is a screen shot of the second stage of training, wherein the screen provides the same problem as the first stage of training but the user is presented with a larger number of buttons to choose from.

DETAILED DESCRIPTION OF CERTAIN EMBODIMENTS

The following detailed description of certain embodiments presents various descriptions of specific embodiments of the disclosure. However, the disclosure can be embodied in a multitude of different ways as defined and covered by the claims. In this description, reference is made to the drawings wherein like parts are designated with like numerals throughout.

The embodiments herein generally relate to the generation and communication of a pre-selected login code having a plurality of elements that are randomly arranged, but becomes personal to its user through a multi-staged training process. In one embodiment, the user has no control over the generation of the login code. Instead, the generation of the login code is performed by a computer system. Even though the user does not select the code, the user will be able to easily recall the login code by way of the training process.

The training process may be based on a method that does not require the use of language, text, or words. Rather, in one embodiment, the training process provides a game-like environment where the user is presented with a problem to solve. As the user solves that problem, the user learns and memorizes the login code.

In one embodiment, the process of login code generation and training 130 involves developing a profile of the user, using that profile to generate a login code, logging the user into the computer system, initiating the training session, presenting the user with an introductory puzzle, and engaging the user in a series of training sessions.

Figure 1:
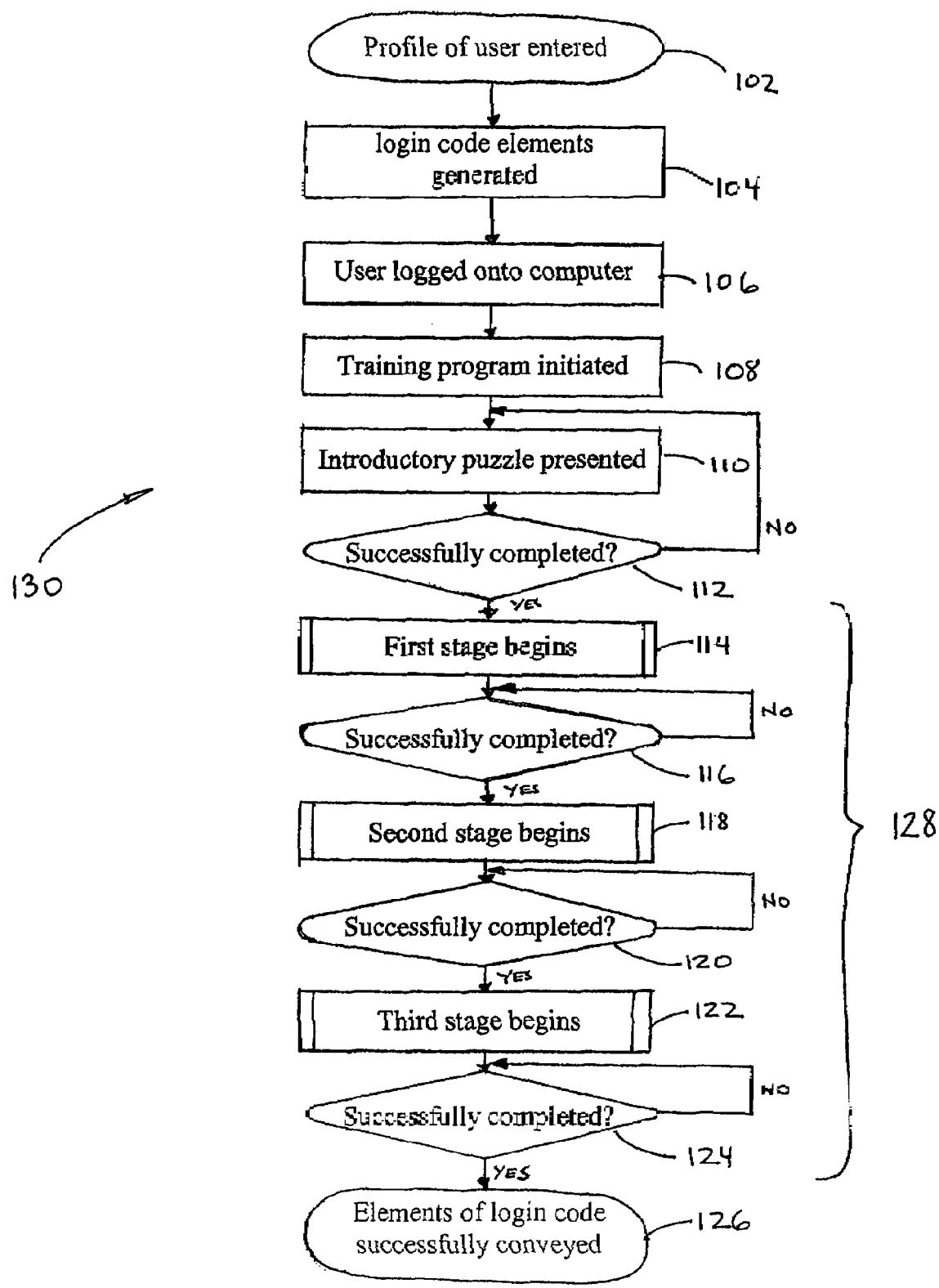
FIG. 1 is a flowchart illustrating an example of the process of login code generation and training.

One embodiment of the process 130 is depicted in FIG. 1 as comprising entering the profile of a user into a computer at block 102. Although this portion of the process is not necessary, entering the profile into the computer, as will be discussed in greater detail, may be helpful in generating login code elements that are easier to remember for the user. After the profile is entered into the computer, the login code elements are generated at block 104 based on that profile. Those elements may be generated and selected by the computer.

To the extent that the login code of the user was based on profiling, the users are logged onto the computer at block 106; in one embodiment, by an administrator. In one embodiment, the administrator logs the user onto the computer using a conventional system, which employs a user name and login code. While block 106 is optional, it assists with the training program by linking the pre-selected login code with the profiled user so that the user can be trained in his or her personalized code. However, in certain embodiments, once the user is successfully trained in his or her login code, it is no longer necessary to log the user onto the computer using the conventional system. The user would only need to enter in his or her login code to access the network.

To the extent the users are logged into the computer, the process 130 then proceeds to initiate the training program at block 108. The training program may begin with an introductory puzzle at block 110 where the user is presented with a problem, which is used to allow the user to discover the "rules" or "goal" of the training program. An advantage of using a puzzle is to eliminate the need for using language-based instructions, which could be a barrier to the learning process for individuals who have difficulty reading and/or understanding a particular language.

The computer may determine at block 112 whether the user completed the introductory puzzle successfully. If so, the user may proceed to the next phase of training. If not, the user is returned to block 110.

Once the user knows the "rules" or "goal" of the training program, the user may be presented at block 114 with the first stage of training. The first stage of training includes a number of training sessions. The number of training sessions, in one embodiment, equal the number of login code elements. For instance, if, in one embodiment, the number of login code elements is thirteen, the number of training sessions may also be thirteen as well.

Figure 2:
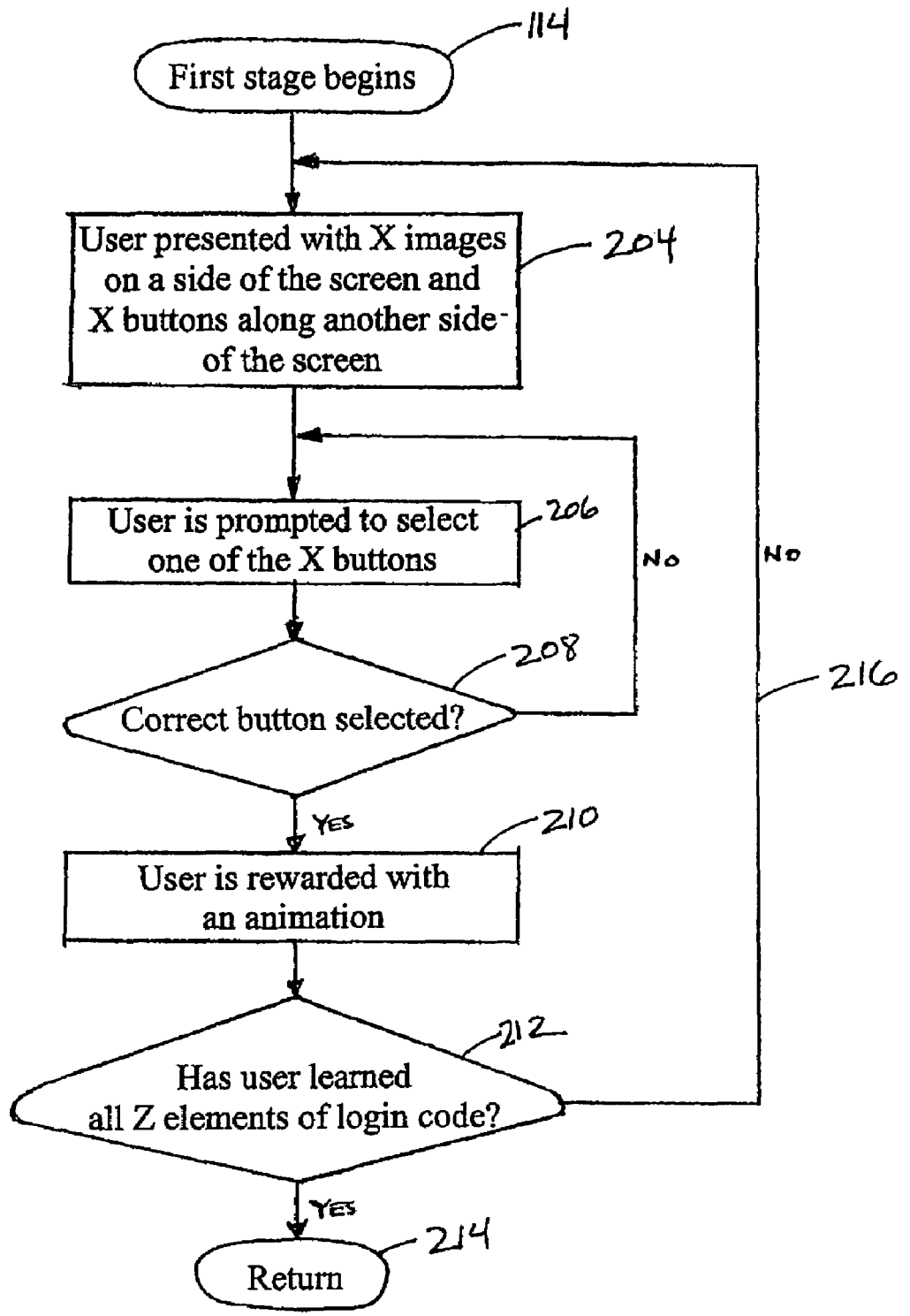
FIG. 2 is a flowchart illustrating an embodiment of the first stage of the training program.

Then, the computer may monitor and determine whether the user successfully completed a session in the first stage of training. If not, the user may, in one embodiment, be continually presented with the same problem from that session until the user successfully solves the problem. Once the user successfully completes all of the sessions in the first stage of training, the user may proceed to the next stage of training. For a detailed summary of the first stage, a flowchart of the first stage is illustrated in FIG. 2.

Figure 3:
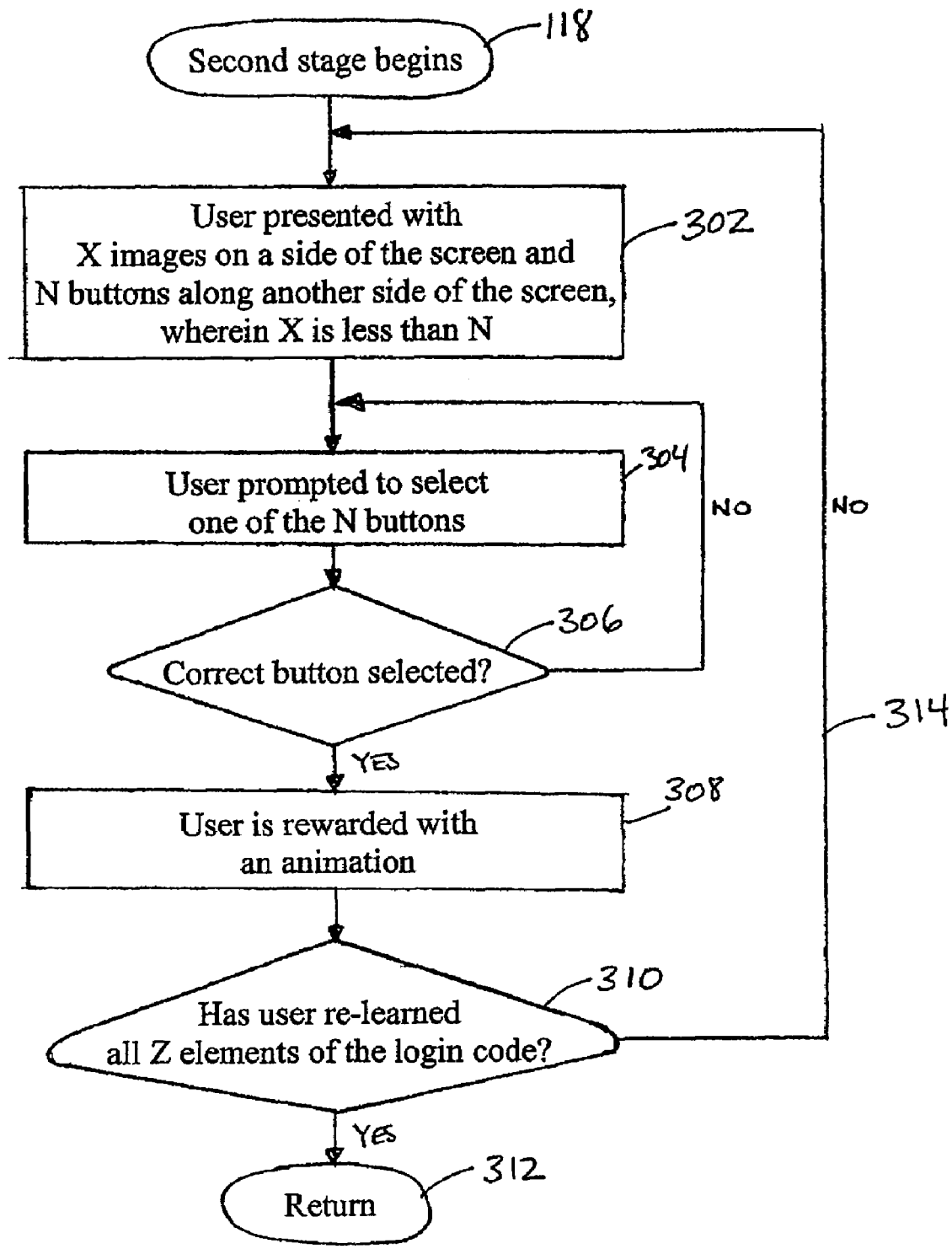
FIG. 3 is a flowchart illustrating an embodiment of the second stage of the training program.

After the user completes the first stage, the user may be presented with the second stage of training at block 118. The second stage of training includes a number of training sessions that, in one embodiment, equals the number of login code elements. The computer may monitor and determine at block 120 whether the user successfully completed a session in the second stage of training. If not, the user is continually presented with the same problem from that session until the user successfully solves the problem. Once the user successfully completes all of the sessions in the second stage of training, the user may proceed to the next stage of training. For a detailed summary of the second stage, a flowchart of the second stage is illustrated in FIG. 3.

Figure 4:
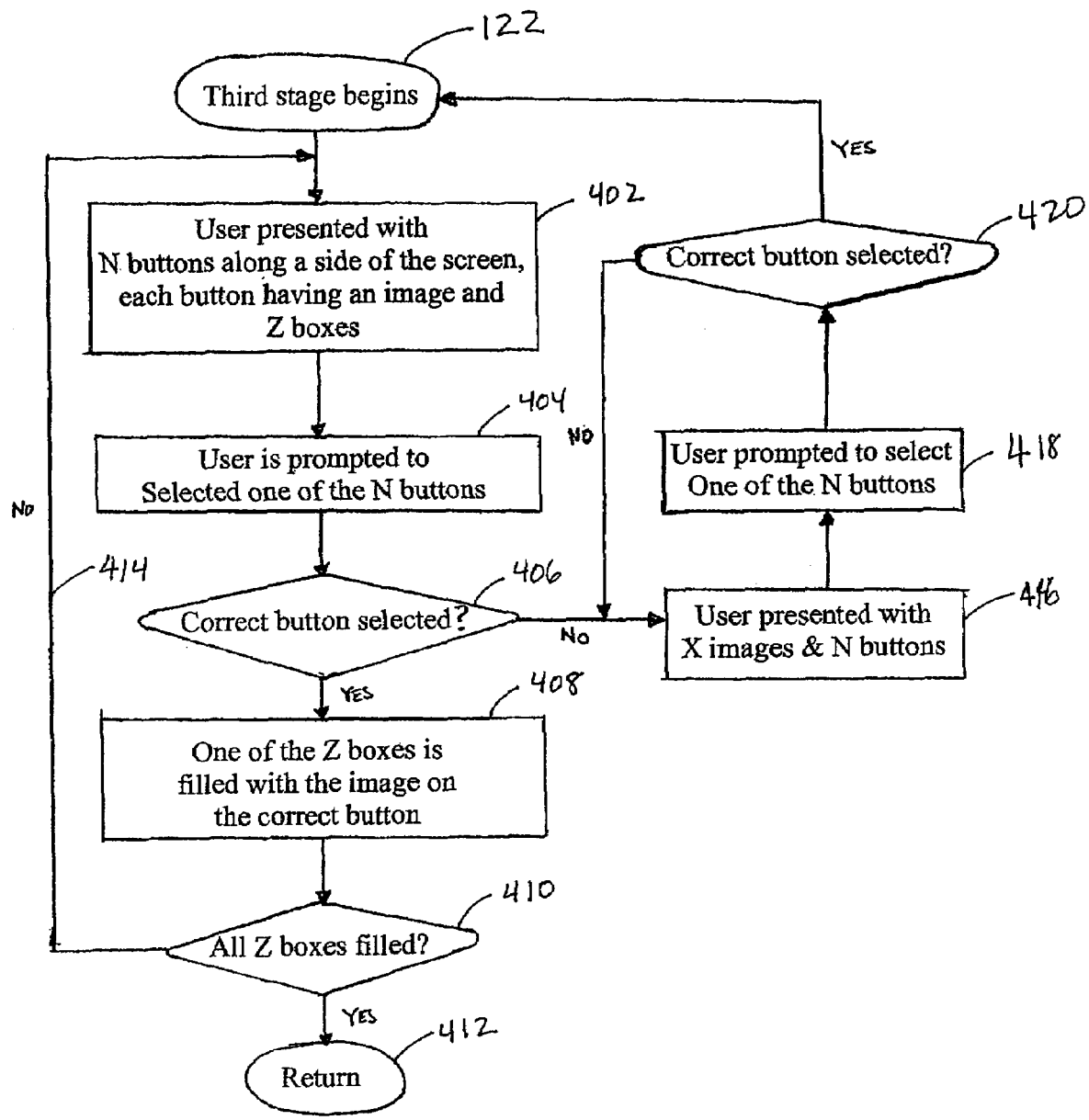
FIG. 4 is a flowchart illustrating an embodiment of the third stage of the training program.

At block 122, the third stage of training begins. The third stage of training includes a number of login prompts. The number of login prompts, in one embodiment, equals the number of login code elements. Each of the login prompts may include a number of buttons. The computer may monitor and determine at block 124 whether the user successfully chose the correct button from a login prompt. If not, the user is retrained in the element of his or her login code corresponding to the correct button. This process continues until the user is able to successfully choose the correct button from all of the login prompts; preferably in one sitting. For a detailed summary of the third stage, a flowchart of the third stage is illustrated in FIG. 4.

At block 126 the training process is complete and the user acquires his or her login code. Based on the above process, a user will be able to recall the elements of his or her login code even if the use of that login code is intermittent and periodic.

Login Code Generation

The preferred login code system provides a unique opportunity as a visual and spatial recognition mechanism to customize the login codes to individuals, or sets of students. Certain groups are far more likely to have lasting impressions of select images than others are. For instance, one of the sets of images can be a set of numbers. Younger students would have a much easier time with a login code having a low number, such as 4, than a high number, such as 24. In addition, the login code could have an element from a set of alphabet images or even have an element or elements reflecting a gender-based bias. For instance, the system can include login code elements for girls having stereotypically gender-based objects like mirrors, flowers and butterflies, whereas login code elements for boys can include objects like volcanoes, trucks and hammers. This ability to enhance the recognition process through purposeful assigning of login code elements only increases the likelihood that the student will retain the information relating to the login code elements for extended periods of time, even without regular use. Accordingly, in certain embodiments, it is useful to obtain a user's profile before generating the login codes.

The user's profile may be developed by surveying the background of the user. In one embodiment, the user provides information about his or her preferences, hobbies, and interests. In other embodiments, the survey could be as simple as the user's gender and age. After the profile of the user is taken, an administrator, such a teacher, enters the profile of the user into the computer. The computer may use the information from that profile to generate a login code that is personal to the user. However, in other embodiments, the computer may randomly select elements for the login code. In such circumstances, the login code may not necessarily be based on the user's profile.

In one embodiment, each user's login code is comprised of thirteen elements; however, the code can be comprised of any suitable number of elements, including but not limited to smaller number of elements such as 3, 4, 5, 6, 7, 8, 9, etc. and even larger number elements such as 18, 27, 36, etc. Each of those elements may be selected from a set of twenty-seven images; however, the number of images within a set of images can be greater or lower than that number. For instance, in one embodiment, the number of images in a set can be 12, 36, or even 48.

Unlike a conventional system, which involves creating login codes based on combinations of only letters from an alphabet or numbers, the login code of this embodiment results in a significantly larger number of combinations. Indeed, by incorporating a wide-range of objects that is not limited to merely letters from an alphabet, the number of unique login codes could exceed as many as four quintillion. Accordingly, the embodiments of the login code contemplate providing each user of the system with a distinct login code that is unique to the user. This provides the opportunity for identifying and tracking the user solely with the login code. In essence, the login code could, in one embodiment, become the user's identification as well as the user's authentication.

Because this is a login code system relying on spatial and visual recognition, it would be difficult for a person to remember a user's login code if the login code was observed or seen over the user's shoulder, for instance. This is because the brain stores each element of the login code as both a picture and a location among the buttons. If a user tries to remember two different selections that could be correct for the same set of buttons, the spatial portion of the mind is being taxed and the chance of accidentally using the wrong object at some point during the login code is high.

Initiating the Training Program

After the computer generates a login code for the user, the administrator may log the user onto the computer. In one embodiment, the administrator logs the user onto the computer using a conventional system, which employs a user name and login code. However, in certain embodiments, once the user is successfully trained in his or her login code, it is no longer necessary to log the user onto the computer using the conventional system. The user would only need to enter in his or her login code to access the network.

Once the user is logged onto the computer and the user is ready to learn his or her login code, the computer, in one embodiment, initiates the login code training program. The training program may begin by presenting the user with an introductory puzzle. Once the user successfully completes this puzzle, the user may be presented with a multi-staged training process, where at least one of the stages of the process includes a plurality of sessions.

In one embodiment, there are a total of three stages of training. Preferably, the user can only progress through each stage of training by successfully completing each stage. The first and second stages each may have thirteen sessions. Each of those sessions, in one embodiment, corresponds to teaching one element of the login code. In the third stage, the user is presented with a test. The user must pass the test before the training program is complete.

The Training Sessions

The training portion of the login program 128 is designed as a one-time exercise for each user to go through in order to memorize their login code. As mentioned earlier, the login code may be assigned to the user prior to entering the game; in one embodiment, the login code is based on the user's profile. The login code may then be slowly introduced to the user in training sessions and may be presented in the form of individual prompts. Each training session includes a set of buttons, and a login prompt. Each button may have an image, and the login prompt may have a number of empty tiles.

The training program may employ a game-like or maze-like environment to teach the user his or her login code. The focus of the game may be an animated character, such as a penguin; however, the character could be any appropriate object including, but not limited to, a bird, a cat, a dog, a tiger, an automobile, plane, a ship, a person, etc. The goal of the game is to escort the animated character across the screen. That goal may be conveyed to the user without the use of any text or language. Instead, the goal is presented as a problem that is discovered by the user through trial and error, or through problem-solving skills. In the process of figuring out that goal, the user understands the rules of the game and is able to learn the elements of his or her login code.

As mentioned earlier, the training program may include a shallow learning-curve progression and comprises an introductory puzzle and three stages. In the introductory puzzle, the user discovers that he or she needs to click on one of three large buttons located near the bottom of the screen. Selecting the correct button causes the animated character to be lifted by a virtual machine or apparatus to a path where the character will move across the screen. This animation helps to teach the user what a "good" outcome looks like.

The introductory puzzle is followed by a set of problems involving three large buttons marked with images that correspond to a set of objects. One of the objects in each problem is an element of the user's login code. In one embodiment, the other two objects in each question will not be seen outside the training program; by isolating these objects to the training program in that embodiment, the user will be less inclined to accidentally associate images of these objects as part of the login code.

First Stage of Training Begins 114

Figure 5:
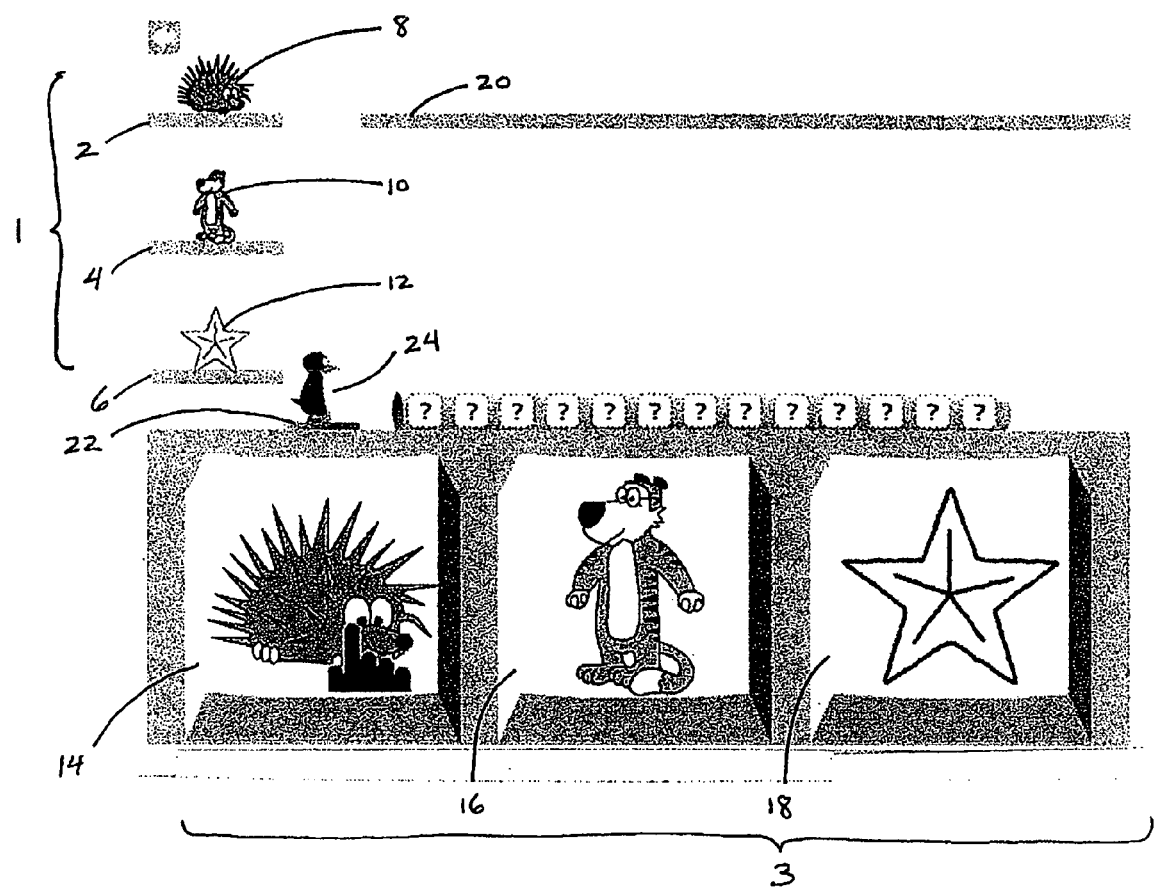
FIG. 5 is a screen shot of the first stage of training showing the path pointing to one of three objects in a set of objects and a row of buttons that has images, each button has an image that corresponds to an image from the set of objects.
Figure 6:
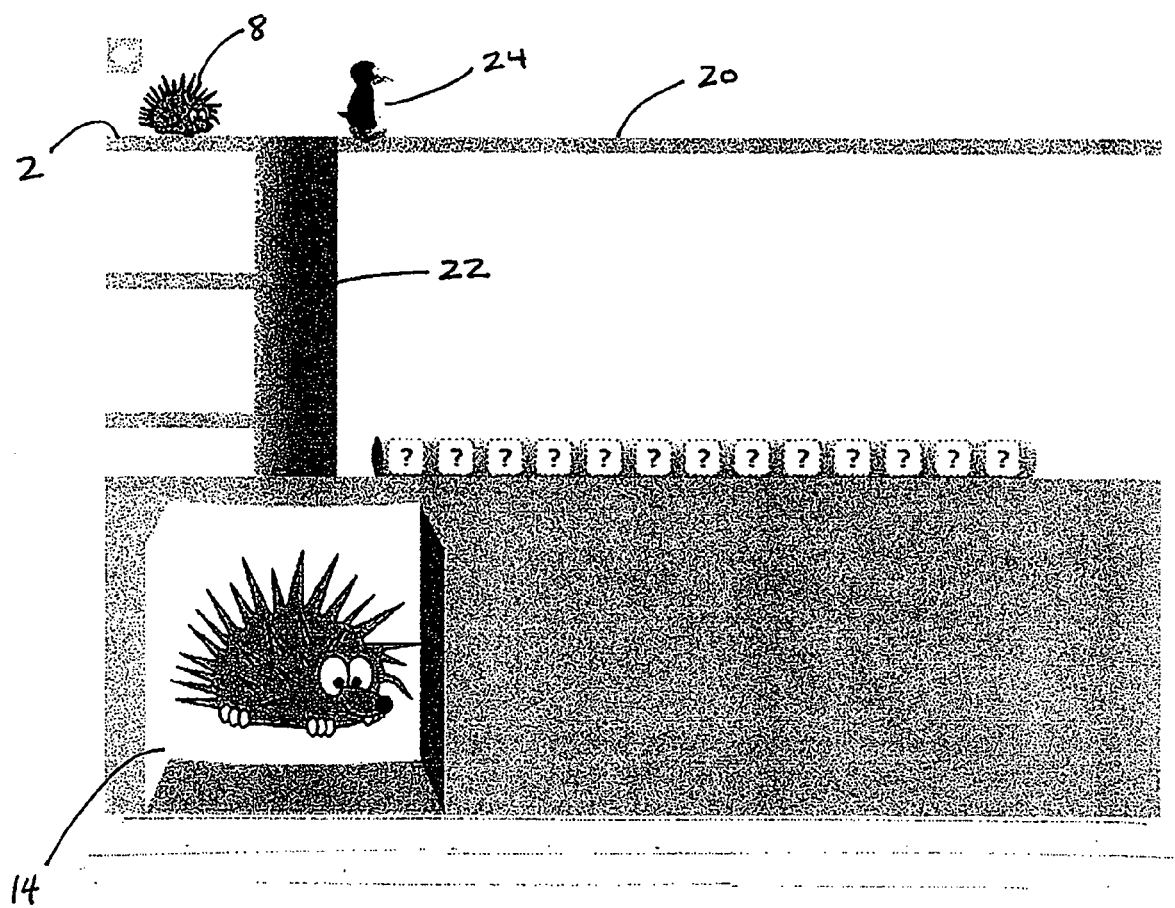
FIG. 6 is a screen shot of the first stage of training showing the result of a user solving the problem and selecting the correct button.
Figure 7:
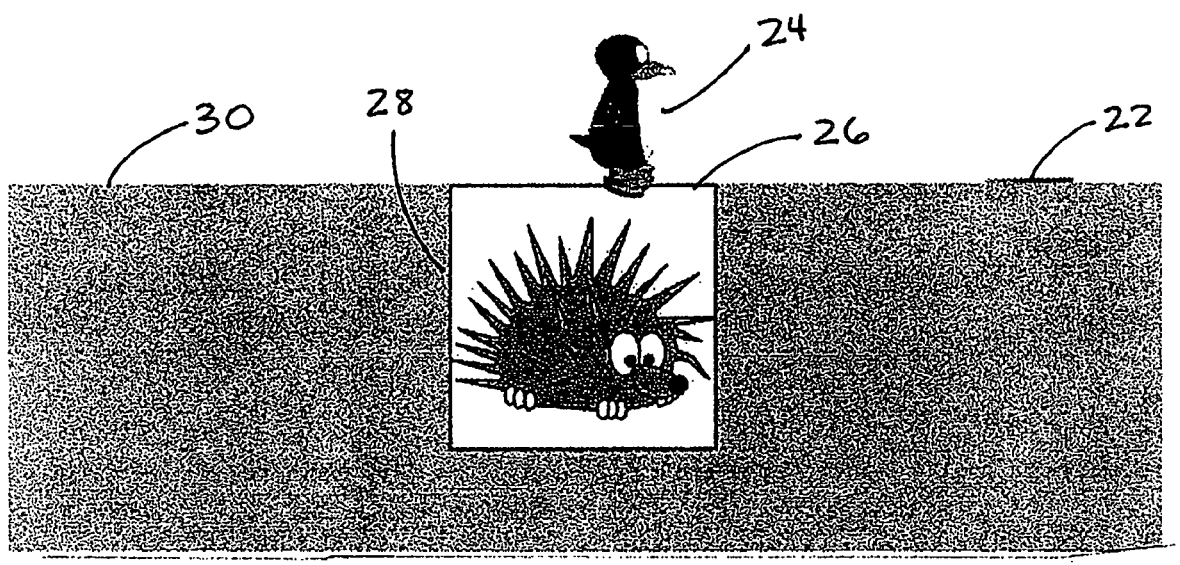
FIG. 7 is a screen shot of the first stage of training after the user solved the problem and selected the correct button.

In one embodiment, the first stage of training has three small platforms 2, 4, 6 on a side of the screen. FIG. 5 is a screen shot of this embodiment. Each of the three small platforms 2, 4, 6 is topped with an object 8, 10, 12, respectively. Another side of the screen bears three large buttons 14, 16, 18. Each of the buttons bears an image of the objects on the three small platforms. One of the three platforms 2 is, in one embodiment, in the same plane as a longer platform 20 stretching off the right side of the screen. The object 8 on the platform 2 in the same plane as the longer platform 20, in this case a porcupine, is the object corresponding to an element of the user's login code; the user must select the button 14 having the image that corresponds to that object 8 in order to proceed to the next stage of the training process. Between the small platforms 2, 4, 6 and the longer platform 20 is a virtual apparatus, machine, or lift 22 carrying the animated character 24. The lift 22 may be parallel to the small platforms 2, 4, 6 and the longer platform 20. If the user selects the correct button 14, the animated character 24 is, in one embodiment, lifted to the longer platform 20 and the other two buttons 16, 18 may disappear leaving only the correct answer 14 showing. When the animated character 24 reaches that longer platform 20, the character may move across it and off of the screen as shown in FIG. 6. After the animated character 24 leaves the screen, the user is presented with a path 30 having a large gap 28. The correct answer choice 26 may, in one embodiment, fill the gap allowing the animated character 24 to reach the lift 22 and be transported to the next problem and training session as shown in FIG. 7.

Figure 8:
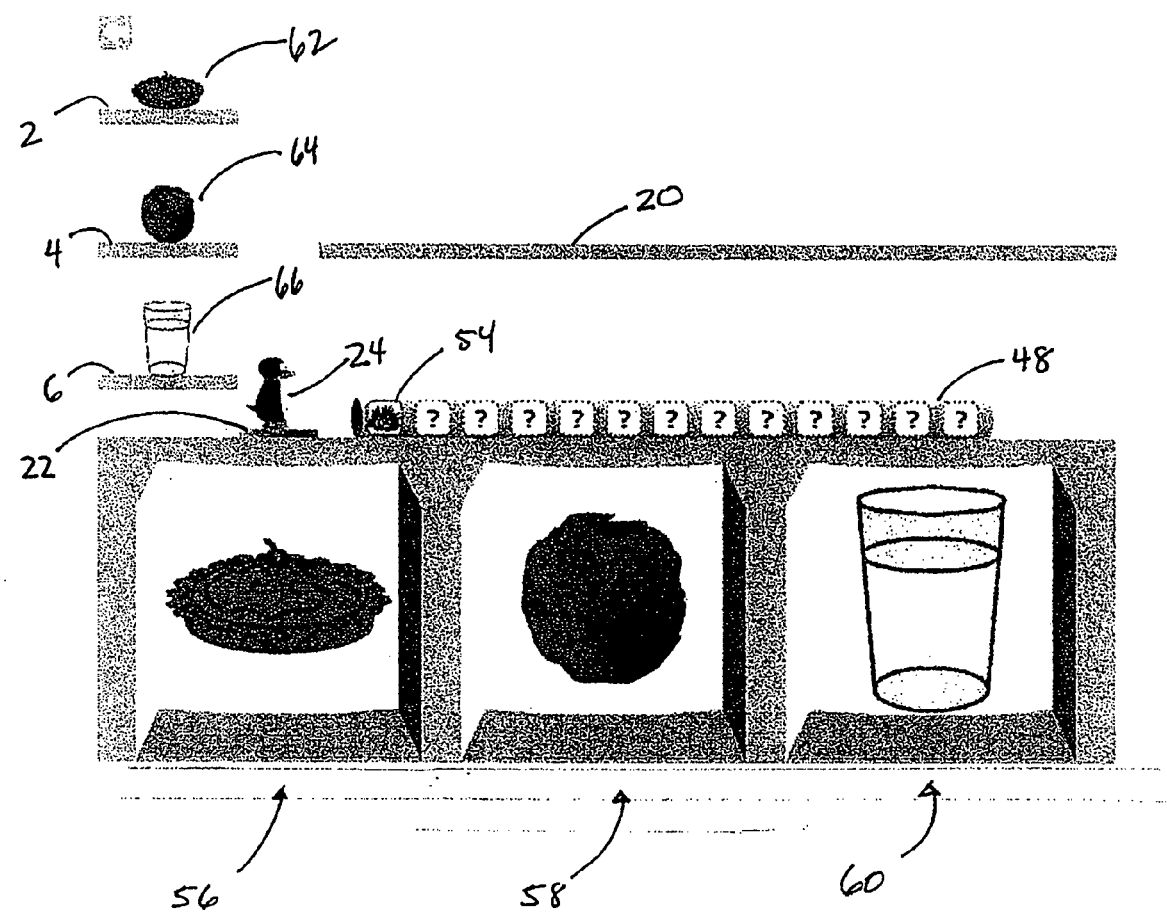
FIG. 8 is a screen shot of the first stage of training showing the path pointing to one of three objects in a set of objects, a row of buttons, each button having an image that mirror one of objects from the set of objects, and one of the elements of the login code in a mark box.
Figure 9:
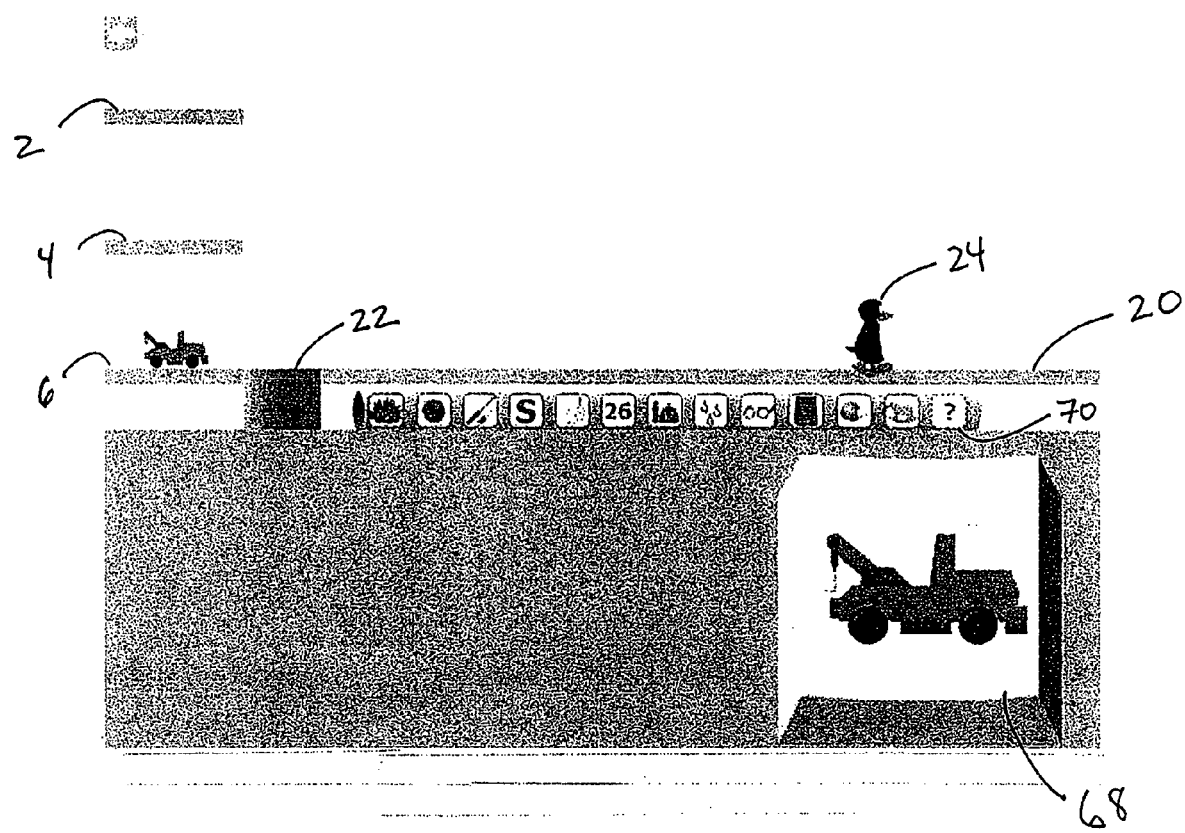
FIG. 9 is a screen shot of the first stage of training after the last element of the login code is correctly identified by the user.

This process may repeat itself by the number of elements in the login code; each time with different objects and a different set of three buttons. And each time, the user may be introduced with another element of the login code. For instance, FIG. 8 shows another session, wherein the user is introduced to another element of his or her login code. The previously introduced login code element 54 may be shown in an area of the screen to help reinforce the image of the element for the user. In one embodiment, the previously introduced login code element 54 is shown in a bar or tunnel 48 above the large buttons 56, 58, 60. As with the previous session, each of the large buttons 56, 58, 60 has an image corresponding to an object 62, 64, 66 on a small platform 2, 4, 6, respectively. The goal, in this embodiment, is for the user to select the correct button having an image corresponding to the object on the small platform in the same plane as the longer platform. In this case, the correct button 58 has an image of a peach 64. If the user selects the correct button, the animated character 24 may, in one embodiment, be lifted to the longer platform 20, where the animated may move across the platform and off of the screen. FIG. 9 shows the animated character 24 moving across the longer platform 20 after the correct button 68 corresponding to the last element 70 of the login code has been selected.

One embodiment of the first stage of training is summarized in the flowchart shown in FIG. 2. The user in this stage is exposed to the elements of the login code for the first time. The number of login code elements "Z" may be thirteen; however, it can be any suitable number. In one embodiment, the first stage includes starting the first stage of training at block 114. Once the first stage of training begins, the user is presented with a set of images at block 204. The number of images in the set of images can be any number "X", but may, in one embodiment, be three. The set of X images may be along one side of the screen. In one embodiment, the set of images 1 is stacked on top of each other along the left hand side of the screen as shown in FIG. 5. Also at block 204, the user is presented with a set of buttons 3 along another side of the screen and may be along the bottom of the screen. The number of buttons in the first stage may be the same number "X" as the number of images so that each button can have an image corresponding to one of the set of X images, such as shown in FIG. 5 in one embodiment.

At block 206, the user is prompted to select one of the X buttons based on the location of a bar relative to the set of X images. The computer system may determine at block 208 whether the user selected the correct button. If the user selected the correct button, the user proceeds to block 210. If the user did not select the correct button, the user is returned to block 206.

At block 210 rewarding the user with an animation such as shown in FIGS. 6 and 7—screenshots of one embodiment of the disclosure. The animation can be any suitable presentation that is entertaining for the user; however, the animation may have various stages that help reinforce the image of the correct button, which, as discussed above, is one element of the user's login code.

After the animation, the computer system may determines whether the user has learned all elements of the login code; wherein the number of elements "Z" may, in one embodiment, be thirteen, but the number of login code elements can be any suitable number. If not, the user is cycled back to block 204 where the user is presented with a set of X new images and X buttons such as shown in FIG. 8. Each of the X buttons has an image that corresponds to one of the set of X new images.

The user is again prompted at block 206 to select one of the X buttons based on the location of a bar relative to the set of X new images. The computer at block 208 again determines whether the user selected the correct button. If the user selected the correct button, the user proceeds to the next screen. If the user did not select the correct button, the user is returned to block 206. This process 216 is repeated until the user has learned all Z elements of the login code.

At block 214, after the user learns the last element of the login code, the user is returned to the process 130 shown in FIG. 1 and proceeds to block 118 where the second stage of the training begins.

Second Stage of Training Begins 118

After the first stage of training, the training process may proceed to the second stage. In one embodiment, the only aspect of the program that changes is an increase in the number of buttons. In the second stage of that embodiment, the user is presented with twenty-seven buttons for each session. The twenty-seven buttons are sub-divided into three groups; each group having nine buttons. Each group may be positioned roughly in the same location as the three large buttons from the first stage. Each of the buttons has an image. The images on these buttons may appear in the normal login program.

Figure 10:
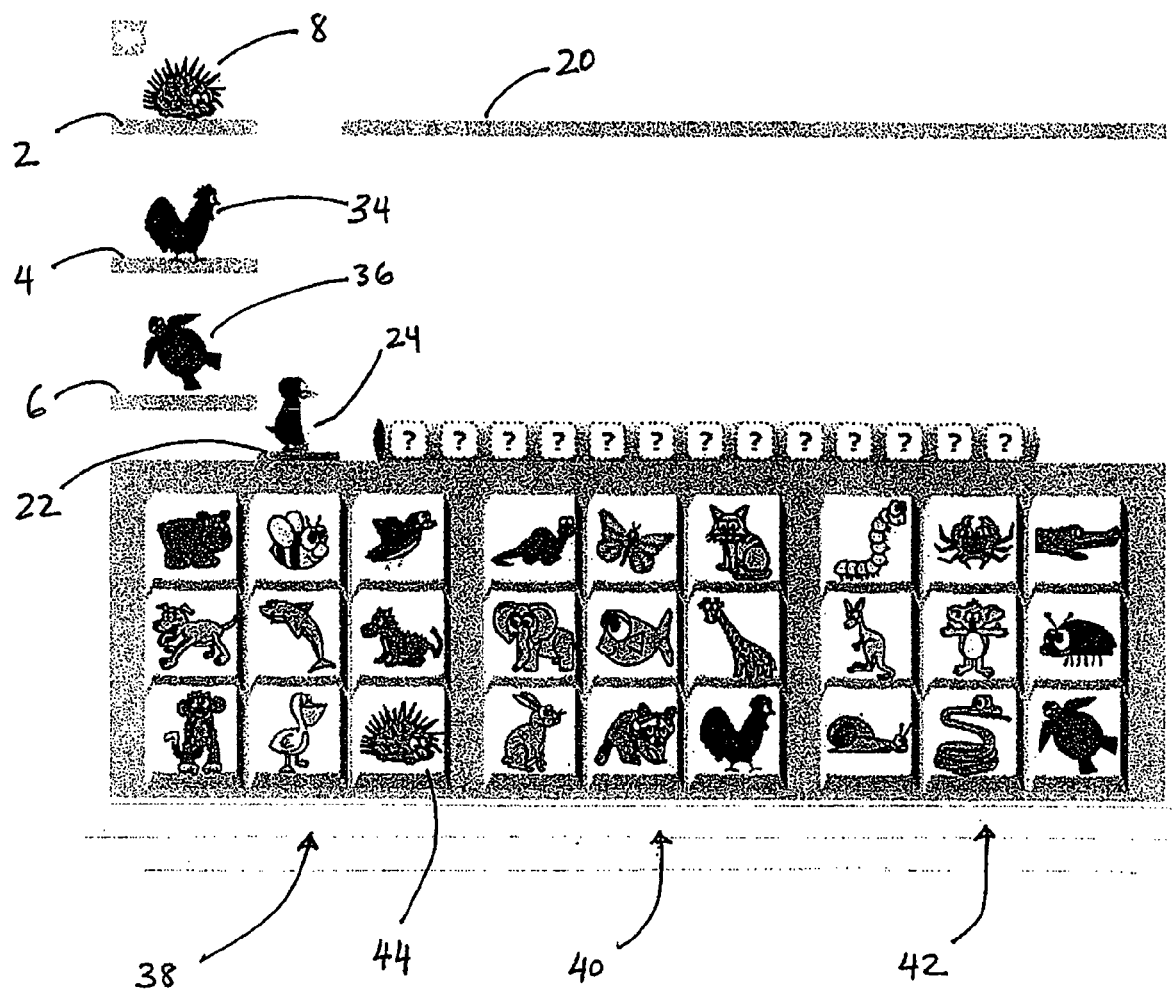

In one embodiment, the second stage, as with the first stage of training, includes three small platforms 2, 4, 6 on a side of the screen and a large platform 20 in the same plane as one of the three small platforms 4. FIG. 10 is a screen shot of this embodiment. Each of the small platforms 2, 4, 6 has an object 8, 34, 38. The object on the small platform 2 in the same plane as the large platform 20 is one of the elements of the user's login code. One of the groups of buttons 38 has an image of that object. The group of buttons 38, 40, 42 with that image may be located in the general area where the large button 14 having that same image 8 was located in the first stage (as shown, for instance, in FIG. 5). For example, if one of the elements of the login code was the right-most button of the three buttons during the first stage of training, an image of that element may be one of the nine objects on the right most group of buttons during the second stage. Keeping the location of the answers the same between stages helps reinforce the learning process for the user.

Figure 11:
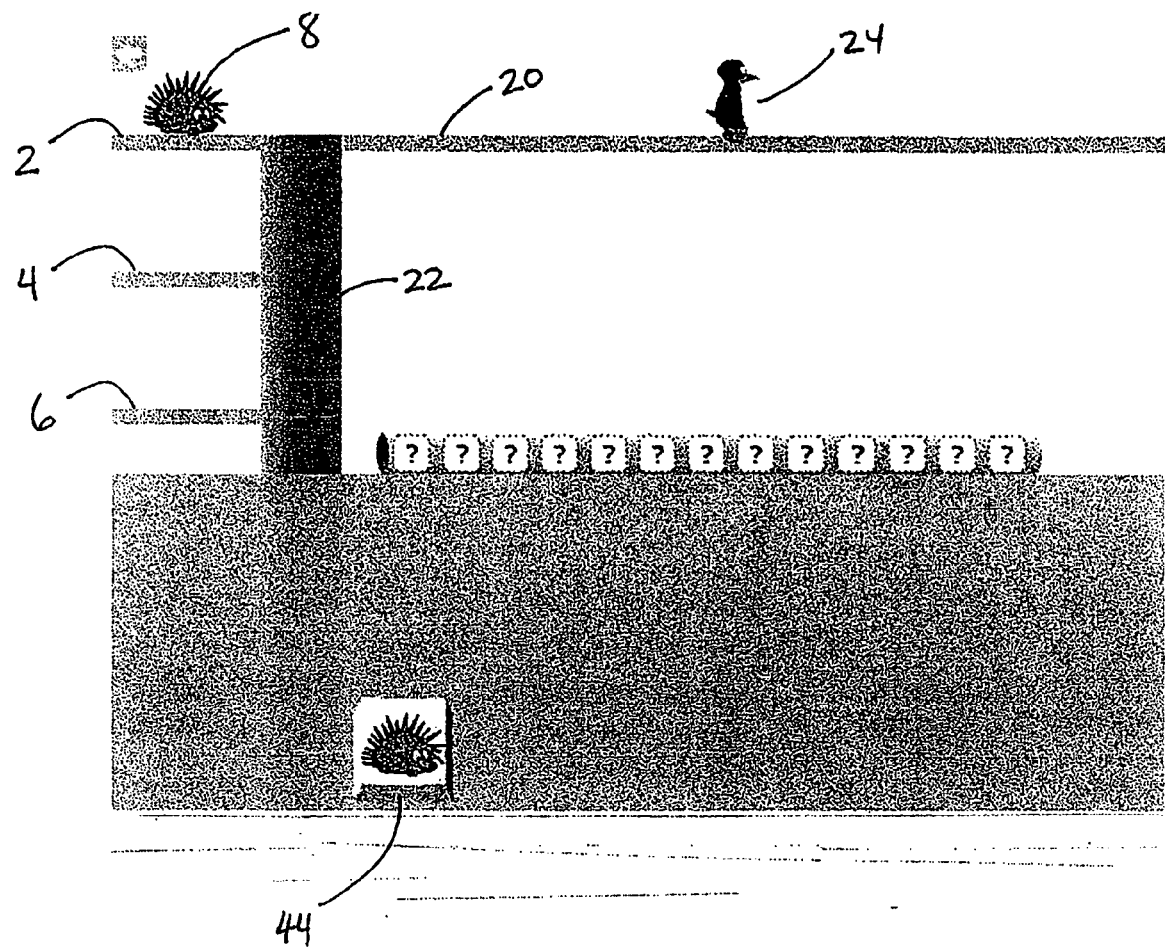
FIG. 11 is a screen shot of the second stage of training showing the resulting animation after the user solved the problem by selecting the correct button.

As with the first stage, the user in one embodiment is presented with and needs to select all thirteen elements of the login code before proceeding to the next stage. Like the first stage, the second stage may have a lift 22 between the small platforms 2, 4, 6 and the longer platform 20. The lift 22 carries the animated character 24. The lift 22 may be parallel to the small platforms 2, 4, 6 and the longer platform 20. As in the first stage, if the user selects the correct button 44, the animated character 24 may, in one embodiment, be lifted to the longer platform 20 and the rest of the buttons may disappear leaving only the correct answer 44 showing on the screen. When the animated character 24 reaches the longer platform 20, the character 24 may move across it and off of the screen as shown in FIG. 11.

Figure 12:
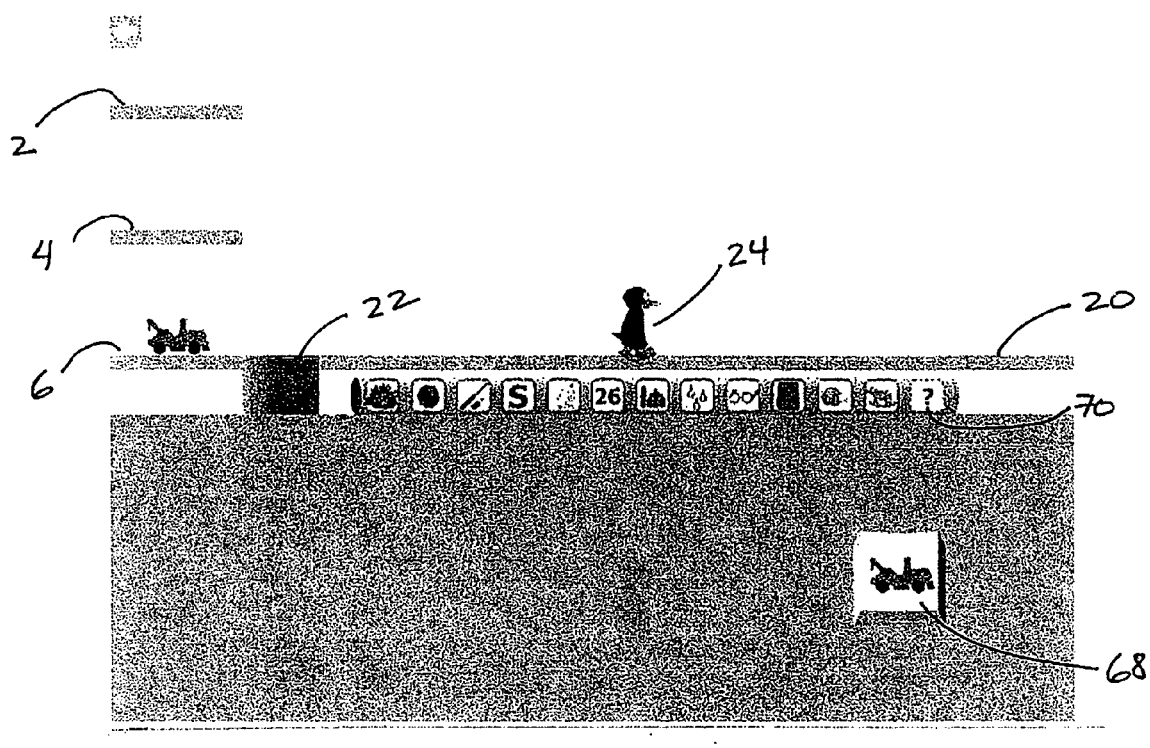
FIG. 12 is a screen shot of the second stage of training showing the resulting animation after the user correctly selected the button corresponding to the last element of the login code.

This process may repeat itself by a number equal to the number of login code elements, each time with different objects and a different set of buttons to introduce the user with another element of the login code. And, each time the user chooses the correct button the user is rewarded with an animated presentation. For instance, in FIG. 12, the animated character 24 is shown moving across the longer platform 20 after the user selected the button 68 with an image corresponding to the last element 70 of the user's login code.

One embodiment of the second stage of training is summarized in the flowchart shown in FIG. 3. In one embodiment, the second stage includes starting the second stage of training at block 118. Once the second stage has begun, the user is presented at block 302 with a set of images, in one embodiment three images, on a side of the screen, in one embodiment on the left hand side, and a set of buttons, in one embodiment 27 buttons, along another side of the screen, in one embodiment on the bottom. Each button may have an image. Some of the buttons have an image corresponding to the set of images. The number of images "X" within the set of images may be less than the number of buttons "N".

At block 304, the user is prompted to select one of the N buttons based on the location of a bar relative to the X images. The computer may at block 306 determine whether the user selected the correct button. If the user selected the correct button, the user proceeds to block 308. If the user did not select the correct button, the user repeats block 304.

At block 308, the user is rewarded with an animation for selecting the correct button. The animation can be any suitable presentation that is entertaining for the user; however, the animation may have various stages that help reinforce the image of the correct button, which, as discussed above, is one element of the user's login code. After the animation is completed, the computer may determine at block 310 whether the user has re-learned all elements of the login code. If not, the user may be cycled back 314 to block 302 where the user may be presented with a set of X new images and N buttons; X of N buttons having an image corresponding to the X images. The user may continue to be cycled back 314 until the user has re-learned all elements of the login code; where the number of elements Z may, in one embodiment, be thirteen.

After the user re-learns the last element of the login code, the user at block 312 is returned to the process of login code generation and training 130, as showing in the flowchart illustrated in FIG. 1. The user may then proceed to block 122. At block 122, the user is presented with the third stage of training.

Third Stage of Training Begins 122

Figure 13:
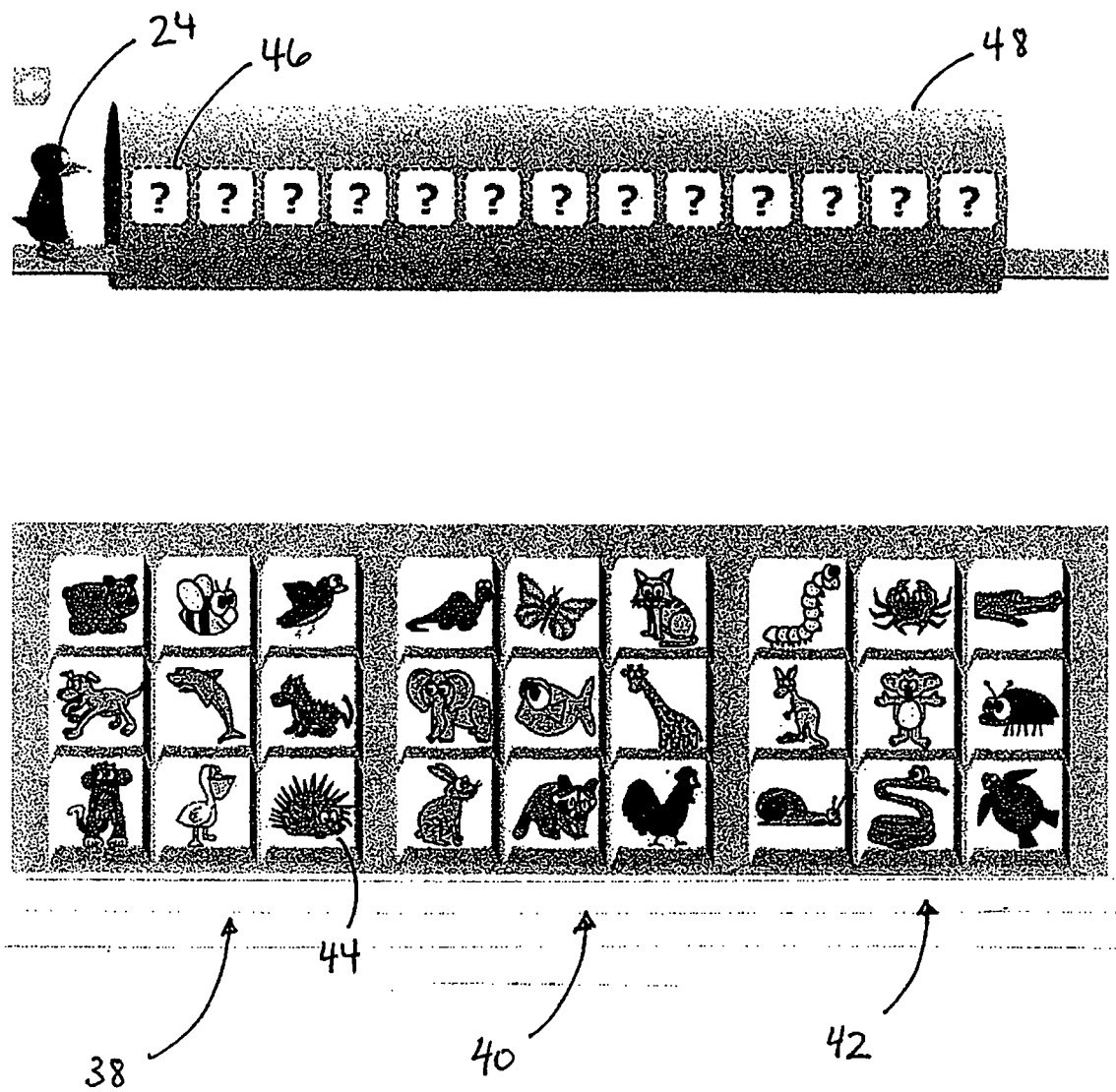
FIG. 13 is a screen shot of the third stage of training, wherein the screen presents a problem for the user to solve.
Figure 15:
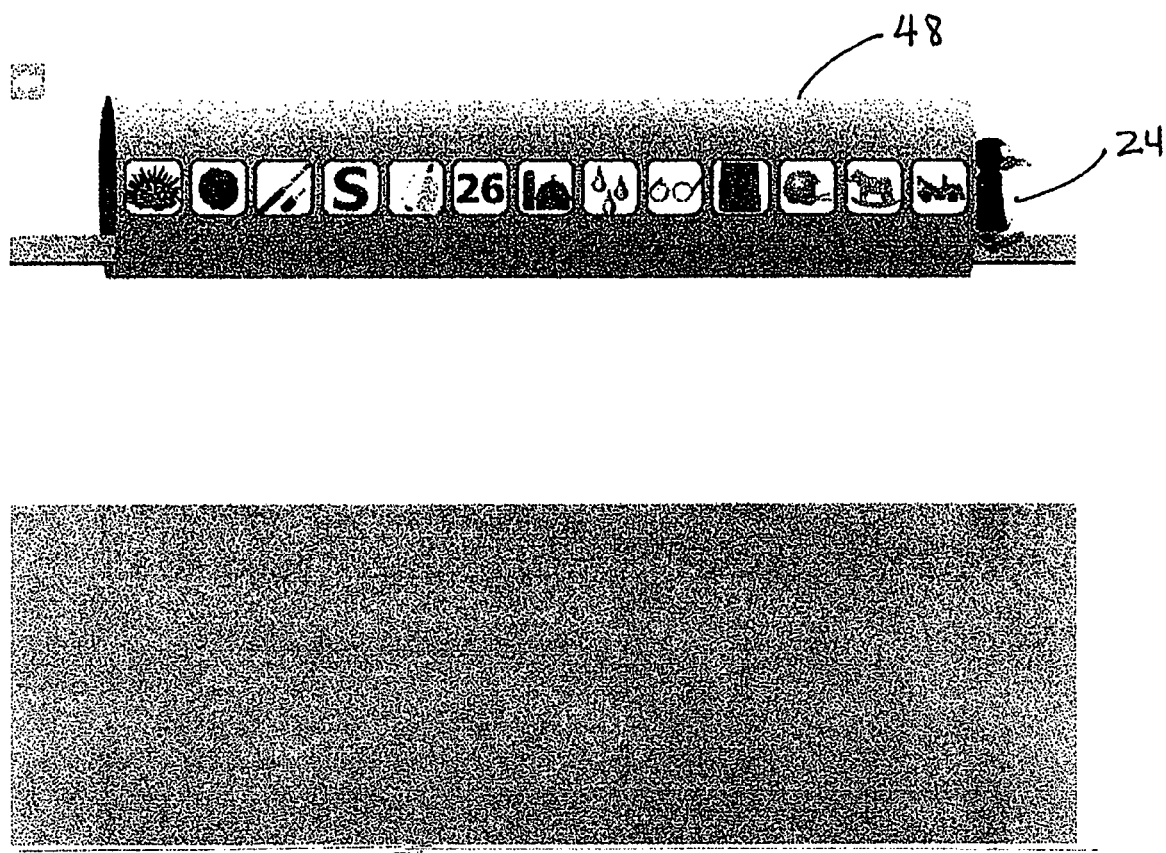
FIG. 15 is a screen shot of the third stage of training, wherein the screen provides an image of completing the training process.

The third stage may be the final portion of the training program. In one embodiment, this stage involves having the user select elements of the login code from memory. The platform system is removed in favor of a row of empty tiles or boxes 46 may be arranged in a tunnel 48 as shown in FIG. 13. The number of tiles or boxes 46 corresponds to the number of elements in the user's login code. The animated character 24 may be located on one end of the tunnel 48. The goal of the user is to move the animated character 24 through the tunnel 48 as shown in FIG. 15.

In one embodiment, there may be twenty-seven buttons like in the second stage. Each button may have an image. In one embodiment, the buttons may be segmented into three groups 38, 40, 42. Each group may have nine buttons. The groups of buttons 38, 40, 42 are located in the same location as in the second stage as shown in FIG. 10. As the user selects, from memory, the correct buttons corresponding to the elements of his or her login code, the images of each element 50 may, in one embodiment, move from the correctly selected button 52 to the empty box 46.

In one embodiment, if the user correctly enters all thirteen elements from memory, the animated character may cross the entire tunnel and training may be complete for that user. However, if the user incorrectly inputs one of the login elements, the game may take the user to a screen that resembles the second stage of the training corresponding to the missed element. The user must select the button corresponding to the missed button. The user may then be returned to the third stage of training and may be asked to enter the entire login code again, from memory. This process may continue until the user has successfully entered his or her entire login code.

One embodiment of the third stage of training is summarized in the flowchart illustrated in FIG. 4. In one embodiment, the third stage of training begins at block 122. The user is presented at block 402 with at set of buttons along a side of the screen and the buttons may be along the bottom of the screen. The number of buttons may be the same number of buttons "N" as used in the second stage of training. The buttons are also, in one embodiment, arranged in the same manner as the buttons presented in the second stage. The similarity in the number and order of the buttons between the second and third stage helps to emphasize the spatial relationship between the correct button and the other buttons. For each login prompt, the correct button may, in one embodiment, be located in the same area in relation to the remaining buttons.

The user may then be prompted to select one of the N buttons in block 404. At block 406, the computer may monitor and determine whether the user selected the correct button. If not, the user may, in one embodiment, be presented, at block 416, with a screen shot resembling a session from the second stage of training such as the screen shot shown in FIG. 10. There may be a set of images along a side of the screen and a set of buttons along another side of the screen; in one embodiment, the number of images "X" may equal three and the number of buttons "N" may equal twenty seven. The arrangement of objects and buttons on the screen may correspond to the session in the second stage which taught the login code element missed at block 406. The user may then be prompted to select one of the N buttons at block 418. As with the second stage, the user may be reminded of the correct button based on the location of the longer platform 20 in relation to the small platforms 2, 4, 6. In one embodiment, the button with an image of the object on the small platform in the same plane as the longer platform is the correct button. In block 420, the computer may monitor and determine whether the user selected the correct button.

If the user selected the incorrect button at block 418, the user is presented again with the same images and same buttons at block 416, and must select the correct button at block 418. This process may continue until the user selects the correct button. If, however, the user selected the correct button, the third stage of training begins again. This may, in one embodiment, involve having the user correctly identify any previously selected login code elements in the third stage.

Figure 14:
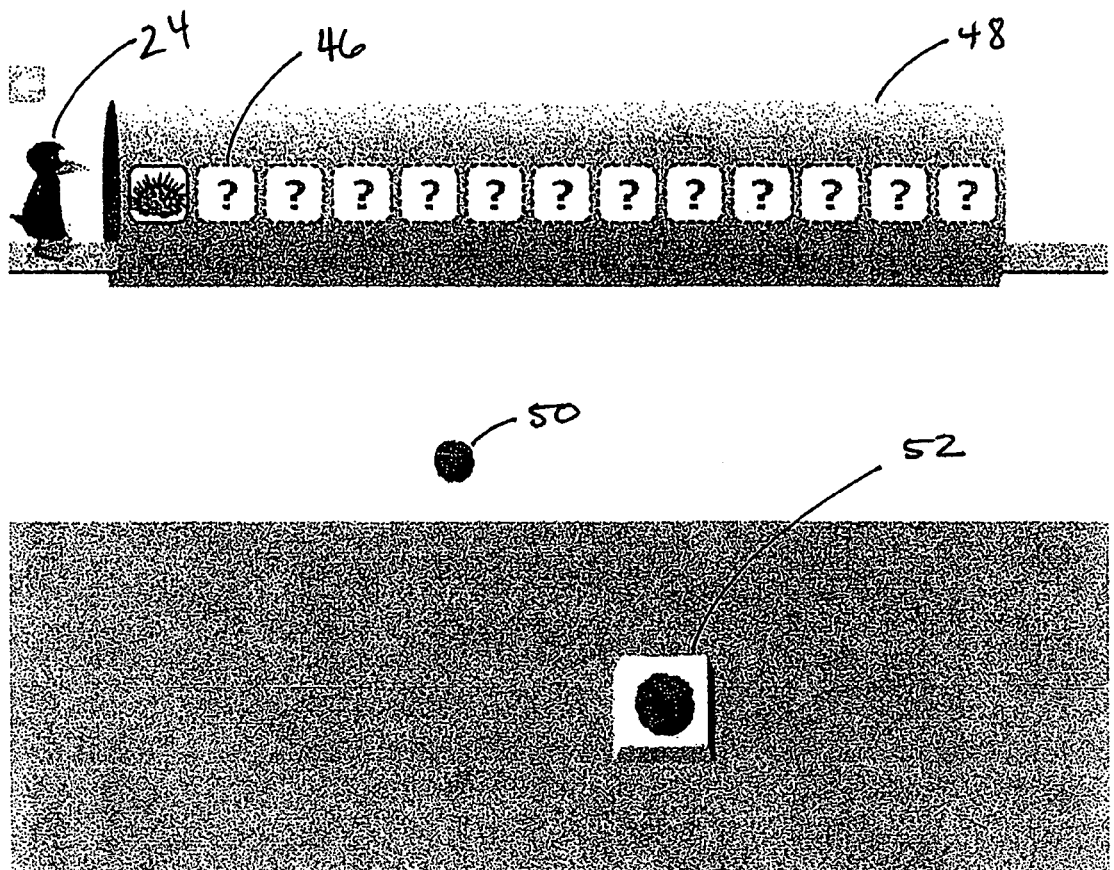
FIG. 14 is a screen shot of the third stage of training, wherein the screen provides an illustration of the result of selecting the correct button.

The user may be presented with N buttons at block 402 and may need to select one of the N buttons at block 404. If at block 406, the computer detects that the user selected the correct button, the user may, in one embodiment, be presented with an animation such as the one shown in FIG. 14. The animation, however, can be any suitable, entertaining presentation that helps emphasize to the user the right answer. In that process, the image on the correct button may fill one of the Z boxes.

At block 410, the computer may consider whether all of the Z boxes are filled. If not, the user may, in one embodiment, be presented with a set of N new buttons at block 402 and may need to select one of those buttons at block 404. The process 414, in one embodiment, may continue until all of the Z boxes are filled as shown in FIG. 15. Once all of the boxes are filled, the third stage of training is complete and the user is returned 412 to the process 130 shown in FIG. 1. At block 126, the system, in one embodiment, may register that all of the elements of the login code have been successfully conveyed to the user through the training program 128.

The Login System

The login system may function in a manner very similar to that of the final part of training. The user may be presented with a series of prompts that may equal to the number of login code elements, which, in one embodiment, may be thirteen. Each of those prompts may have a plurality of buttons and each of those buttons has an image. In one embodiment, there are twenty seven buttons. In that embodiment, those twenty-seven buttons may be sub-divided into three groups, each group having nine buttons. Of the series of prompts, each prompt has one button that has an image corresponding to one of the elements from the login code.

The order of the login prompts may follow the same order as the sessions from the training program. However, the order of the login prompts is not necessarily restricted in that manner. In one embodiment, the order of the login prompts may be random. In such a circumstance, the arrangement of the elements of a user's login code does not matter. Logging into the network is merely a function of remembering the thirteen elements of the code and not the order of those elements.

When elements of the login code are entered, the program may connect to the login database and retrieve any information correlating to the login combination entered. If the login code is invalid, the user may, in one embodiment, be informed. There is no "down-time" or wait for the retrieval of login information. Even on the most basic of network connections, the time it takes for the animated character to cross through the tunnel should be sufficient to retrieve the information necessary.

Recalling the Login Code

Users that are trained based on the above method will remember their login code even after long periods without using their code. The method trains users to associate their login codes spatially and visually. Users will be able to recall elements of their code within each of the login prompts. In certain embodiments, users will also be able to recall information based on the specific arrangement of their code along the tunnel. Because of the visual and spatial character of the login process, a user will be able to retain a single code for many years and even for a lifetime. As a result, it is possible to assign a single login code to a person and track that person's history based on that code. This is particularly useful in an educational environment. By having a persistent database of login codes and student information for each of those codes, an administrator is able to track a student's progress over the course of their development throughout the student's entire educational process. This new possibility will allow educators more fluid and informative access to data on their students. It is recognized, however, that the benefits of this login system and method of training extends beyond educational environments. For instance, it could be beneficial to governmental agencies and business environments to name a few.

While the above detailed description has shown, described, and pointed out novel features of the invention as applied to various embodiments, it will be understood that various omissions, substitutions, and changes in the form and details of the device or process illustrated may be made by those ordinary skilled in the technology without departing from the spirit of the invention. This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of a computer system communicating to a user a pre-selected, personalized login code having a plurality of elements, wherein each element is a unique identifier, the method comprising:
   generating, by the computer system, a problem, wherein the problem involves a goal of having an object displayed on a computer screen traverse a path between a first point and a second point on the computer screen;
   receiving, by the computer system, a solution to the problem, the solution involving a selection of an image from a first set, the first set comprising a plurality of images on the computer screen, wherein one of the images from the first set corresponds to one of the plurality of elements from the login code; and
   animating, by the computer system, the object to move from the first point to the second point when the solution is received;
   wherein the path serves as a pointer to an image from a second set of images on the screen, the second set comprising a plurality of images.

2. The method of claim 1, wherein the solution further involves selecting the image from the first set that corresponds to the image that the path is pointing to in the second set.

3. The method of claim 2, wherein the image that the path is pointing to in the second set corresponds to one of the plurality of elements which comprise the login code.

4. The method of claim 1, wherein the number of the plurality of images from the first set is different than the number of the plurality of images from the second set.

5. The method of claim 4, wherein the plurality of images from the first set is a subset of the plurality of images from the second set.

6. The method of claim 1, further comprising generating, by the computer system, the login code.

7. The method of claim 6, further comprising receiving, by the computer system, a profile for the user, wherein the login code is generated based on the profile.

8. The method of claim 7, wherein the login code comprises a gender-based bias.

9. The method of claim 7, wherein the profile comprises one or more of the user's preferences, hobbies, interests, gender and age.

10. The method of claim 1, further comprising displaying, by the computer system, the goal on the computer screen.

11. The method of claim 1, wherein the object comprises a character.

12. The method of claim 1, wherein generating the problem by the computer system comprises generating the problem for each of the plurality of elements from the login code.

13. The method of claim 12, wherein the computer system generates the problem until the computer system communicates each element of the login code at least two times to the user.

14. A system for logging onto a network, the system comprising:
   a processor in data communication with a network,
   an input interface between a user and the processor, the input interface enabling the user to select items displayed on a computer screen; and
   a program executed by the processor and configured to:
      receive a login code having an arrangement of elements, wherein each element is a unique identifier with no relationship to adjacent elements, and wherein each element is required for providing access to the system;
      display a login screen, the login screen comprising a plurality of login prompts following a random sequence, each login prompt comprising a plurality of images, one image from the plurality of images corresponding to an element of the login code; and
      authorize logging onto the network dependent on the user selecting the image from the plurality of images that corresponds to one element of the login code in each of the plurality of login prompts.

15. The system of claim 14, wherein the program is further configured to display further comprising an object on the computer screen that becomes animated when the user successfully selects all of the elements from the login code from the plurality of login prompts.

16. The system of claim 15, wherein the object is a character.

17. The system of claim 14, wherein the plurality of images is different for each of the plurality of login prompts.

18. A system for logging onto a network, the system comprising:
   a processor in data communication with a network;
   an input interface between a user and the processor, the input interface enabling the user to select items displayed on a computer screen; and
   a program executed by the processor and configured to:
      receive a login code having an arrangement of elements, wherein each element is a unique identifier with no relationship to adjacent elements, and wherein each element is required for providing access to the system;
      display a login screen, the login screen comprising a plurality of login prompts, each login prompt comprising a plurality of images, one image from the plurality of images corresponding to an element of the login code; and
      display a character on the computer screen that becomes animated when the user successfully selects all of the elements from the login code from the plurality of login prompts.

19. The system of claim 18, wherein the plurality of login prompts follows a random sequence.

20. The system of claim 18, wherein the program is further configured to authorize logging onto the network dependent on the user selecting the image from the plurality of images that corresponds to one element of the login code in each of the plurality of login prompts.

* * * * *

UNITED STATES PATENT AND TRADEMARK OFFICE
CERTIFICATE OF CORRECTION

PATENT NO.        : 7,653,931 B1  
APPLICATION NO.   : 11/218293  
DATED             : January 26, 2010  
INVENTOR(S)       : Peterson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Twenty-eighth Day of December, 2010

David J. Kappos
*Director of the United States Patent and Trademark Office*